(No Model.) 3 Sheets—Sheet 3.
S. W. RUSHMORE.
MULTIPOLAR DYNAMO ELECTRIC MACHINE.
No. 587,163. Patented July 27, 1897.
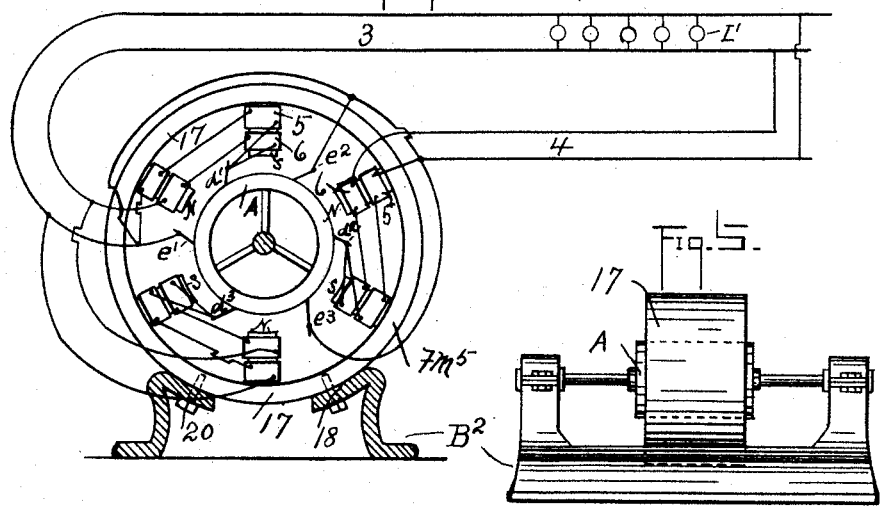
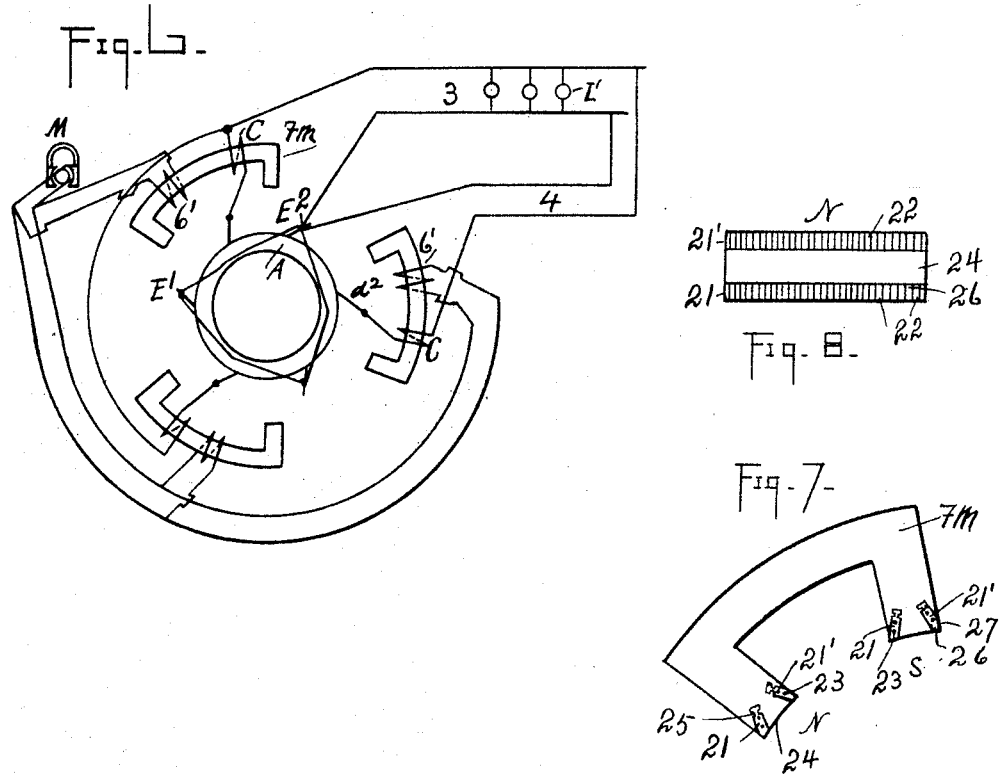
Witnesses
Albert Popkins
Benj. R. Catlin
Inventor
S. W. Rushmore
By Charles M. Catlin
Attorney

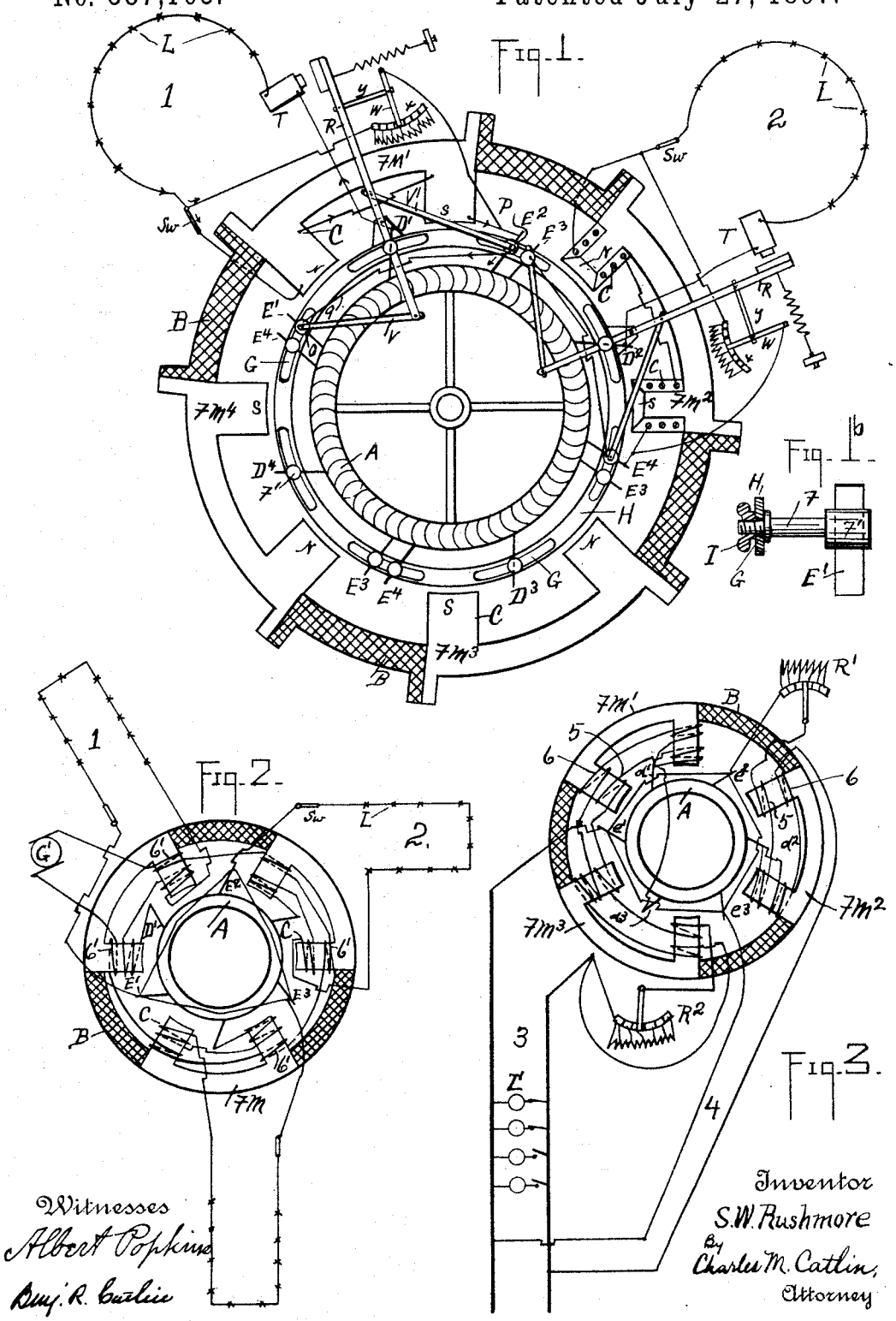

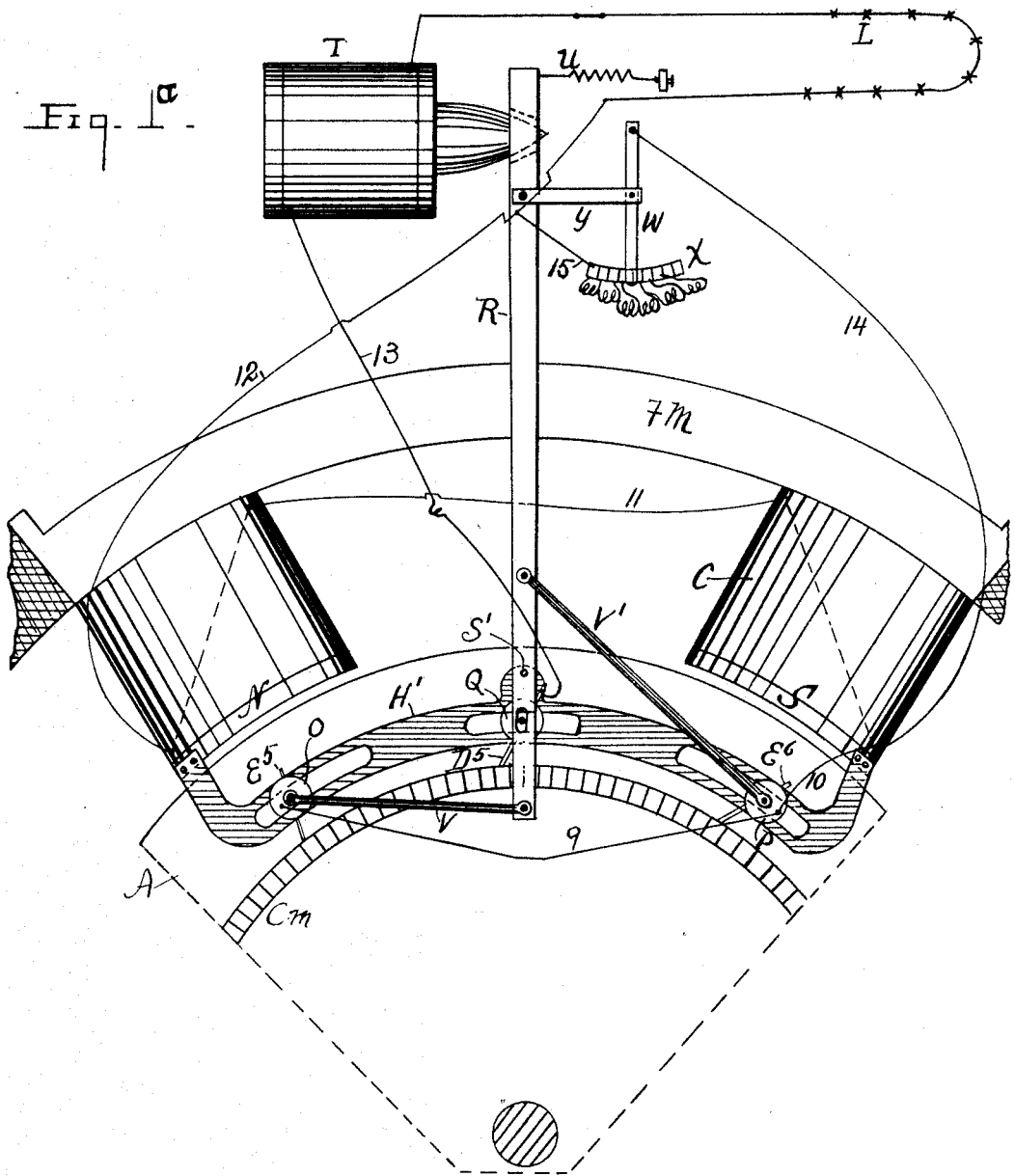

UNITED STATES PATENT OFFICE.

SAMUEL W. RUSHMORE, OF BROOKLYN, NEW YORK.

MULTIPOLAR DYNAMO-ELECTRIC MACHINE.

SPECIFICATION forming part of Letters Patent No. 587,163, dated July 27, 1897.

Application filed February 23, 1897. Serial No. 624,644. (No model.)

*To all whom it may concern:*

Be it known that I, SAMUEL W. RUSHMORE, a citizen of the United States, and a resident of Brooklyn, county of Kings, and State of New York, have invented certain new and useful Improvements in Multipolar Dynamos and Circuits Therefor, of which the following is a specification.

One of the main objects of this invention is to provide a multipolar dynamo and novel circuit connections adapted to deliver two or more separate currents to separate circuits. In lighting or other large electric systems it frequently is desirable to subdivide the lamps or other translating devices into two or more groups in separate circuits, each requiring less than the whole current of a large multipolar dynamo, such as now in general use. Such subdivisions of translating devices has required the use of separate dynamos for the separate circuits, and this is objectionable because of the expense of the machines and for driving them and because of the large floor-space required, and for other reasons. This invention avoids these and other objections.

Another object of the invention is to provide improved feeder connections from such multipolar dynamos.

Another object is to simplify the construction of multipolar dynamos.

In the drawings, Figure 1 is a partial end view of a dynamo and a diagram of circuits embodying the invention. Fig. 1$^a$ shows one section of a dynamo with automatic regulator. Fig. 1$^b$ is a detail view of a brush-holder. Figs. 2, 3, 4, and 6 show, diagrammatically, different machines. Fig. 5 is a side view of the dynamo of Fig. 4. Figs. 7 and 8 show a detail of a field-magnet.

Around an armature is a field having four or more alternating poles N S in pairs, forming separate magnets, with suitable coils. Bearing on the commutator at points between all of the poles are brushes in groups of three, connected as follows: One brush of each group is connected to one side of a circuit, the other two brushes of the same group, being on opposite sides of the first brush and of the same two poles, are connected to the opposite side of the same circuit. The field-coils of these two poles are connected in this circuit, whereby the strength of said poles will depend on the work being done in said circuit. The other groups of brushes are likewise connected to separate circuits through separate field-magnet coils.

Referring first to Fig. 1, A is a ring-armature with a continuous winding. F M' F M$^2$ F M$^3$ F M$^4$ are several separated field-magnets each having a pair of poles N S arranged around the armature. The several magnets are separated magnetically but united mechanically by brass or other non-magnetic sections B. C are field-coils. D' D$^2$ D$^3$ D$^4$ are commutator-brushes which bear on the commutator or on the armature-coil about midway between the poles of the field-magnets. E' E$^2$ are brushes which bear on the commutator or on the armature-coil outside of the poles of their magnet that is under the non-magnetic sections B. There are similar brushes E$^3$ E$^4$ for the other magnets. These brushes may be manually adjustable, for example, by being supported by rods F, Fig. 1$^b$, projecting from slots G in the insulating-ring H, having means, as nuts I, for clamping them to the ring; but when the machine is used for supplying several independent circuits with currents of constant volume, as for series arc-lighting, the brush-holders F' will not be clamped to the ring, but will be free to move in slots G, and the voltage will be automatically varied, as required, by shifting the brushes in their relative positions upon the commutator or by placing a proper resistance in shunt with the terminals of the field-magnets adjacent to said brushes, or both. Thus the voltage of the several circuits may be varied, as required, that each circuit may receive a constant current independently of the currents in the other circuits supplied by the machine.

The machine shown in Fig. 1 is adapted to supply four circuits, though for simplicity of illustration but two, 1 2, are shown, each having translating devices, as arc-lamp L and switches Sw, by which they can be separately controlled. One side of each circuit is connected to the field-coil of one magnet, thence to the brushes outside of the poles of the same magnet. The other side of each circuit is connected to the brush between the poles of the same magnet and, when automatic regulation is used, through magnet T. The regulating devices are substantially the same as shown in Fig. 1ª, hereinafter described. The circuit is clearly traced by arrows in Fig. 1, circuit 1. No one circuit takes the current generated in the whole armature-coil, but each circuit takes the current generated in the portion of said coil which lies between the corresponding brushes $E'$ $E^2$, &c.—that is, in the part of the armature under one of the field-magnets—the machine being of such capacity that said part of the entire output will suffice for one of the circuits. Each field-magnet is energized by the current passing to the circuit connected to the brushes adjacent to it. Hence the strength of each magnet and the current generated in the subjacent portion of the armature-coil will automatically vary in accordance with the work being done in its circuit. The circuits are independent of each other and can be in use singly or together without harmful interference and without destroying the balance of the machine.

While the machine may be made to work with the polarity of the magnets arranged to form consequent poles, I prefer to work with the poles alternately north and south, for the reason that when so working the maximum potential generated is only that produced under a single pair of poles, while if the poles were consequent—that is, north, north, then south, south, and so on—the potentials within the machine would be double that of the single circuits and subject the insulation of the machines and circuits to unnecessary strain and be dangerous to life.

To prevent the polarity of the separate magnets becoming consequent and to keep them arranged alternately, I propose to wind each of the separate magnets with a separate winding, and thus all the magnets will be partially excited in a constant polarity from a source of constant direction. I may connect all these separate windings in series and connect them in series with one of the sections of the armature in series with its external circuit, but I prefer to supply it from a source outside the machine.

As in arc-lighting, the magnets will be excited at all loads to a point approaching saturation of the iron. This separate winding may form a large part of the total magnet-winding, thus making the machine certain to be active at all times to make reversal of polarity impossible.

Fig. 2 shows three circuits and a series multipolar dynamo having a separate exciting-generator $G'$ and exciting-coils $6'$ in addition to series coils C.

Fig. 6 also shows a series machine with separate exciting-coils $6'$ in circuit with a magneto M. A portion of this dynamo is connected to a constant potential circuit 3, having lamps $L'$. Another portion is connected to a feeder-circuit 4, which is in effect a separate circuit, although it connects with the main circuit at some distance from the dynamo.

It has been proposed heretofore to take separate currents from a multipolar dynamo, but so far as I know I am the first to take current from sections of an armature-coil adjacent to separate pairs of poles, conducting such currents through separate field-magnet coils and to separate circuits, thus making the strength of each of the magnets dependent on the work done in its separate circuit.

The magnets F M may be separated by open spaces, as indicated in Fig. 6, or connected in any way which allows the current generated between brushes $E'$ $E^2$ (or $E^3$, $E^4$, &c.) to be separately conducted to its separate circuit and to control the strength of the corresponding magnet. For example, the dynamo may have a continuous ring field-magnet $F M^5$, with internal pole-pieces alternately N and S, as shown in Fig. 4. In this case the poles in pairs serve as separate magnets without serious interference.

To circuit 3 are connected in multiple the brushes $d'$ $d^2$ $d^3$, standing between the poles constituting the several magnets, and also the brushes $e'$ $e^2$ $e^3$ $e^4$, outside of said poles, all of these brushes being connected. There is but one brush between each pair of magnets, instead of two, as in Fig. 1.

Brush $d^2$ is not connected directly to the mains, but to the feeder-circuit 4. The current in the mains furnished by the part of the armature A between $e^3$ and (to the right in Fig. 3) $e^2$ will vary automatically with the work in circuit 3, and the current furnished to the feeders by the part of the armature between $e^2$ and $e^3$ will vary automatically with the fall in potential between the dynamo and the point of connection of the feeders to the mains. It is not essential that all but one of the brushes $d'$, &c., be connected to a single circuit 3, since other connections can be made without departing from my invention.

The field of the generator consists of a ring 17, of cast iron or steel, unfinished—i. e., not machine-worked—on its outer periphery and having an even number of interior poles. On each of such poles are both series coils 6 and shunt-coils 5. The central brushes $d'$ $d^2$ $d^3$ of some of the sections are connected through the series coils of their own magnets or sections to one side of the main circuit. These brushes are also connected through the shunt-coils to the outer brushes of the same sections, said outer brushes being connected to the other side of the main circuit.

One or more sections of the generator, in the figure one—namely, between brushes $e^2$ $e^3$—is or are similarly connected to the feeder-circuit. The shunt-coils constitute means for exciting the magnets in addition to the series coils above described.

$B^2$ is a cast-iron base having a bearing 18 of the same radius as the periphery of the ring of the field, so that the ring rests snugly in it. In the field-magnet are holes extending through the ring. In the base at the same distance apart are holes through which extend bolts 20 for securing the ring and base together. The periphery of the ring being unplaned it may not accurately fit the base when first tried, but can be turned to bring any other part over the holes in the base, and if necessary turned end for end and tried further until an accurate fit is found. This is, of course, done before the holes are drilled in the ring. The ring-casting will always be perfect enough to give a good fit in one of its positions, and economy in machine-work results.

In Fig. 1$^a$, which shows means for automatic regulations in addition to the regulation effected by the exciting-coils, as hereinbefore mentioned, F M is one field-magnet of a machine similar to that shown in Fig. 1—that is, having several similar but practically independent magnets arranged around a single armature. N S are the poles of the magnet. A is the armature, with a commutator C M, on which (adjacent to said N S poles) bear two outer connected brushes $E^5$ $E^6$ and a central brush $D^5$. H' is a slotted insulating frame or bracket supported from the magnet-poles, and O P Q brush-holders carried thereby, (or if bracket H' be of conducting material from which the brush-holders carried thereby should be insulated.) O P are holders for the outer brushes $E^5$ $E^6$, and Q is a holder for brush $D^5$. R is a lever pivoted at S' and forming the armature or armature-lever of a magnet T in the circuit of lamps L. U is a spring tending to pull the armature from the magnet. Below pivot S' in the lever is a slot into which extends a pin projecting from holder Q. To lever R below holder Q is pivoted a link V, the opposite end of which is connected to brush-holder O. At a point above, but nearer the pivot than link V, is connected a link V', extending to holder P. W is a switch-arm adapted to be moved over resistance-contacts $x$ by link $y$.

The circuit connections are as follows: Brushes $E^5$ $E^6$ are connected by wire 9, thence by wire 10, magnet-coils, and wires 11 12 to the lamp-circuit, through magnet T and wire 13 to the central brush. Wires 14 15 and the resistance form a shunt around the field-coils.

The automatic regulation is effected thus: When the current becomes too weak, spring U draws armature-lever R from the magnet, which moves brushes $E^5$ $E^6$ farther apart, thus including between them more of the active armature-coils, increasing the current sent through the field-coils, and hence the current generated in that section of the armature. Link V being connected farther from pivot S' than link V', brush $E^5$ will be moved farther than $E^6$, but brush $D^5$, moving in the same direction as $E^5$, and a distance equal to the difference in distance through which $E^5$ $E^6$ move, (the leverages being rightly proportioned,) will maintain its position halfway between $E^5$ $E^6$. This movement of the brushes compensates for the shifting of the field with the change of load. The same movement of lever R moves arm W to the right, throwing more resistance into the shunt 14 15, which also throws more current through the field-coils and further increases the potential generated. When the current becomes too strong, the brushes and resistance device will be moved reversely by magnet J, thus reducing the potential.

The regulator described does not regulate the dynamo as a whole, but regulates the part the current of which is conducted through the coils of field-magnet F M. Each of the other magnets, which in the complete machine are arranged around the same armature, will, as in Fig. 1, (or may) have similar automatic regulators, each controlling the current of its own magnet and section of armature, the several regulators in the machine being thus independent in their action. The circuit connections in Fig. 1 vary slightly from those of Fig. 1$^a$, but will be clear without further description.

I do not limit myself to an armature with continuous or closed circuit winding, but I may use different systems of winding and connecting the several coils of the armature.

In Fig. 3, which shows a shunt-wound dynamo, adjustable resistances R' R$^2$ form means for varying the potential delivered to the feeder and main circuits, respectively. It is evident that the brush-moving lever R, Figs. 1 and 1$^a$, may be moved by hand instead of by magnets T, if desired.

In order to prevent undue heating of field-magnet poles by eddy-currents, it is common to laminate the poles by building them up of sheet-iron or other subdivided metal. In my machine the body of the magnet and the bodies of the poles are solid castings of iron or steel, but the inner ends of the poles or parts thereof are provided with laminated or subdivided sections forming permanent parts of the poles. Since eddy-currents in dynamo-poles are of greatest intensity at the corners or edges of the poles from and toward which the armature is moving in its rotation, (particularly the former,) the sections I prefer to place only at such corners, but do not limit myself to this arrangement.

In Fig. 7 is shown a side view of one field-magnet or section F M with poles N S, in the ends of which, and preferably in the corners from and toward which in a complete machine the armature rotates, are subdivided sections 21 21', built up of layers 22 of sheet-iron, bound together by rivets or bolts 23 and having notches and projections, as at 25. In making the magnet the sections 21 21' or either are placed in the mold in the desired position, preferably inclined toward the center, and the body of the magnet is then cast. The metal partially surrounding the sections and entering the grooves at 25 securely holds the sections in position and makes them permanent parts of the poles. The sections preferably are so arranged as to extend in both directions from the corners, as at 26 27, and so as to have the central part 24 solid casting, but the invention is not limited to this particular arrangement.

I claim—

1. The combination, in a multipolar dynamo, of an armature, several magnets arranged about the armature, and sets of brushes for separately collecting the currents generated in the parts of the armature under the different magnets, independently of other sections, and connections from each set of brushes through the field-coil of its magnet only.

2. The combination of an armature, several magnets arranged about the armature, such magnets being separated from each other by brass or non-magnetic material so that the magnetism shall not flow from magnet to magnet, sets of brushes for separately collecting the currents generated in the sections of the armature under the different magnets independently of the other sections, connections leading from the different brushes, and separate circuits to which such separate currents are conducted.

3. The combination of a ring-armature with a continuous winding, several magnetically-independent magnets about the armature, brushes separately collecting currents generated under the different magnets, and connections carrying each such separate current through the coil of its generating-magnet only.

4. The combination of an armature, several magnets arranged about it, the magnets having separate magnetizing-coils, a brush between the poles of each magnet, and brushes between the magnets, whereby the current generated in the armature under the magnet can be separately collected, and connections for conducting such separate currents through the coil or coils of their generating-magnet only.

5. The combination of an armature, several magnets coöperating therewith, a commutator, brushes for collecting the current generated under the different magnets, one or more sets of brushes being connected to supply a circuit of translating devices, and feeders for such circuit connected to other sets of brushes, and means for controlling the currents in the circuit and feeders.

6. The combination of an armature, several magnets coöperating therewith, each being energized in whole or in part by the current generated under it, a main circuit to which a part of the armature-coils is connected, and a feeder connected to the main circuit to which another part of the armature is connected.

7. The combination of an armature, a field-magnet having alternate N and S poles around the armature being in pairs to constitute separate magnets, series coils for each magnet connected to the part of the armature under such magnet, other exciting-coils for such magnets, a main circuit to which a part of the armature-coils is connected, and a feeder-circuit connected to the main circuit to which another part of the armature is connected.

8. The combination of an armature, a field-magnet having alternate N and S poles around the armature being in pairs to constitute separate magnets, a brush between the poles of each magnet, and brushes between the magnets, whereby the current generated in the armature under each magnet can be separately collected, connections for conducting such separate currents through series coils of their generating-magnet only, and exciting-coils on the magnets in addition to the series coils.

9. The combination of a main circuit, a feeder-circuit therefor, a multipolar generator with alternate N and S poles in pairs to constitute separate magnets, connections for conducting the current from the armature beneath some of the magnets to the main circuit and for conducting the current from another part of the armature to the feeder-circuit, and means for varying the potential delivered to the feeder-circuit.

10. The combination of a multipolar field-magnet, an armature, a commutator, brushes to collect the current generated in a section of the armature-coil under a pair of the poles, other brushes to collect the current generated in other sections of the armature-coil under other pairs of the poles, and independent automatic regulating devices for the different sections.

11. The combination of a multipolar field-magnet, an armature, a commutator, commutator-brushes including the armature-coil under a pair of the poles and a brush between said poles, automatic means for moving the first-mentioned brushes toward and from each other, and connections whereby the current from the said part of the armature-coil is led through coils on said pair of poles only.

12. The combination with one of several field-magnets arranged around a single armature, of adjustable brushes $E^5$, $E^6$, $D^5$, lever R for moving the brushes, brushes $E^5$, $E^6$ being adapted to be connected to one side of an external circuit and brush $D^5$ to the other side, and a magnet operating on lever R and connected or adapted to be connected directly in an external circuit, said magnet and the field-magnet being in series.

13. The combination of a multipolar field-magnet, an armature, a commutator, several sets of commutator-brushes under the different poles of the field-magnet and including different sections of the armature, automatic brush-shifting devices for each set of brushes adapted to shift each set of brushes and vary the strength of the magnet-poles acting on the armature-coils included between the brushes so shifted for maintaining a constant current in each of the separate sections of the armature and the circuit supplied thereby.

14. The combination of a field-magnet, an armature, a commutator, two commutator-brushes or sets of brushes, another brush or set of brushes between the first brushes, means for causing the outer brushes to separate from each other in a direction around the commutator, one brush moving at a rate faster than the other and means for causing the third or central brush to move at a rate and in a direction to maintain its central relation between the outer brushes.

15. A field-magnet of cast magnetic metal with sections of subdivided magnetic metal secured at the ends of the poles, in corners or edges thereof, said sections extending diagonally into the poles and being partially embedded in the casting.

16. A field-magnet of cast magnetic metal with sections made of formed sheets of iron or steel secured together and in corners or edges of the poles.

Signed this 13th day of February, 1897.

SAML. W. RUSHMORE.

Witnesses:
 J. HERBERT POTTS,
 W. G. E. LEE.